Sept. 21, 1965  C. H. POWELL  3,206,806
CORNER STRIP MEMBER FOR INTERCONNECTING PANELS
Filed Jan. 16, 1961  8 Sheets-Sheet 1

INVENTOR.
CLAYTON H. POWELL
BY
Shanley & O'neil
ATTORNEYS

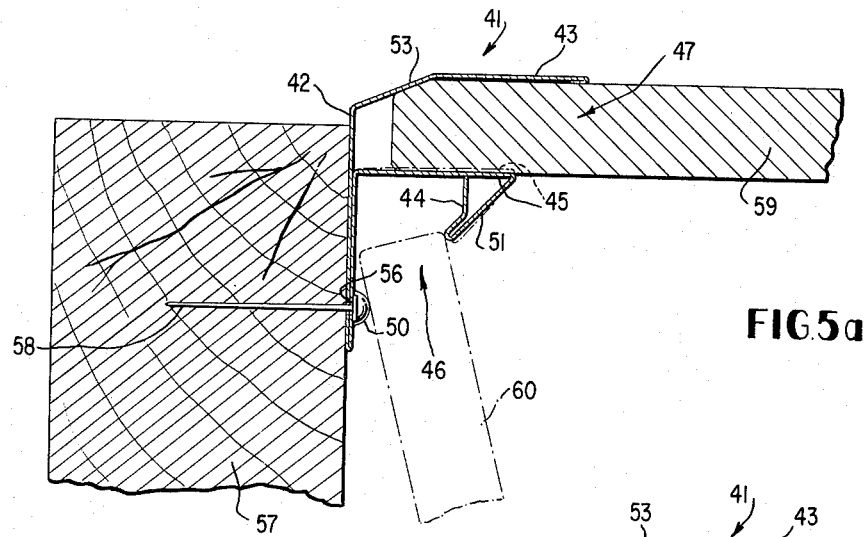
FIG.5a
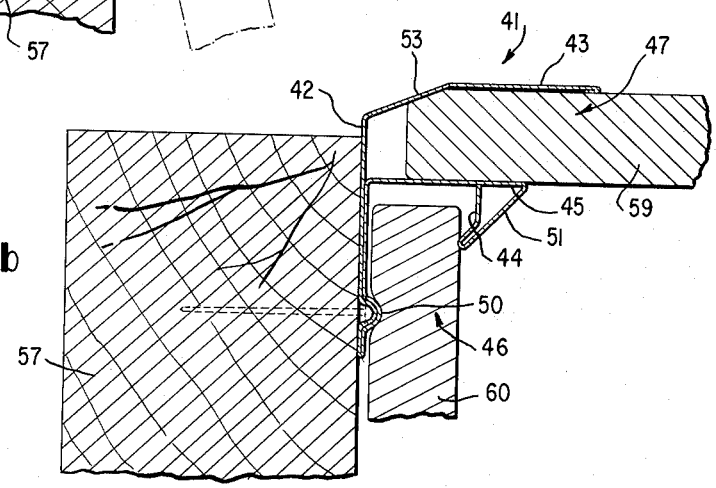
FIG.5b
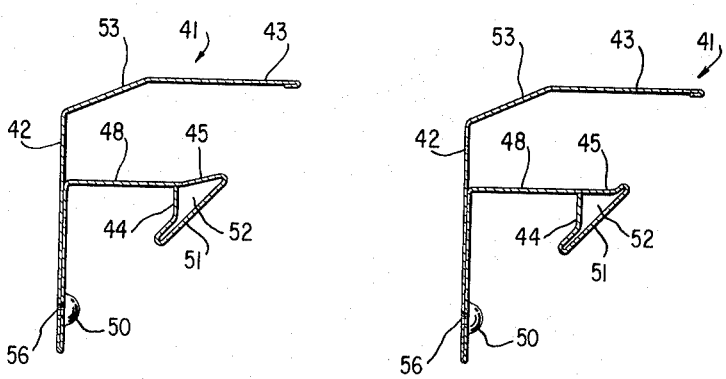
FIG.5c
FIG.5d
INVENTOR.
CLAYTON H. POWELL
BY Shanley & O'Neil
ATTORNEYS

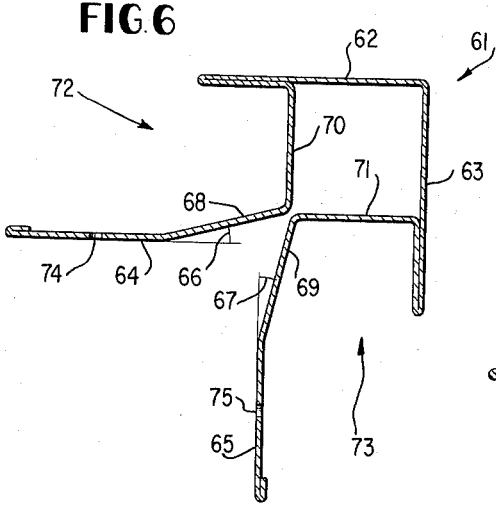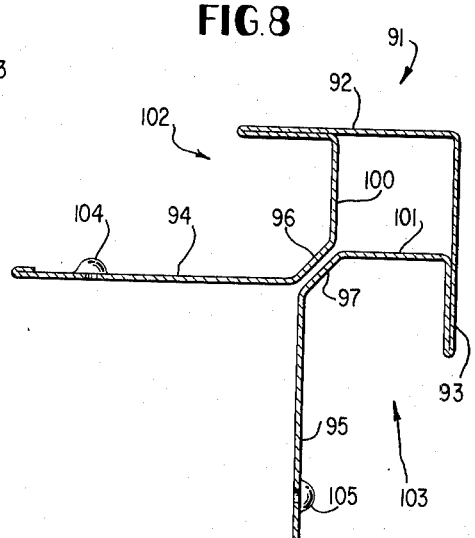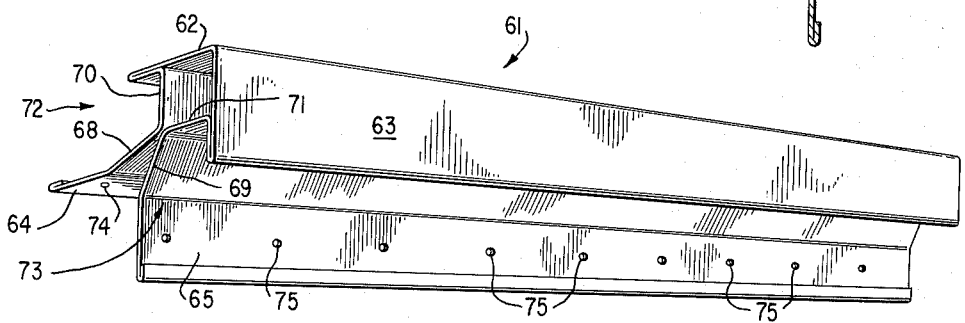

Sept. 21, 1965                    C. H. POWELL                    3,206,806
                CORNER STRIP MEMBER FOR INTERCONNECTING PANELS
Filed Jan. 16, 1961                                          8 Sheets-Sheet 4

INVENTOR.
CLAYTON H. POWELL
BY
*Shanley & O'Neil*
ATTORNEYS

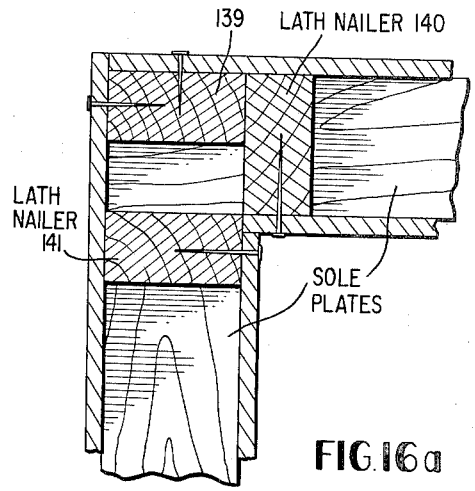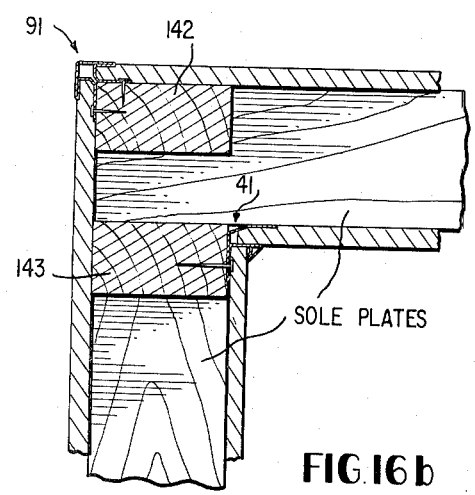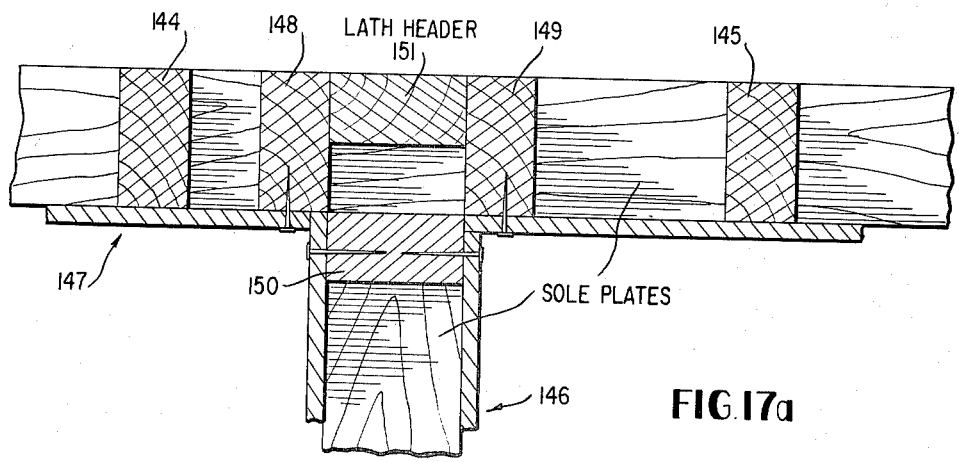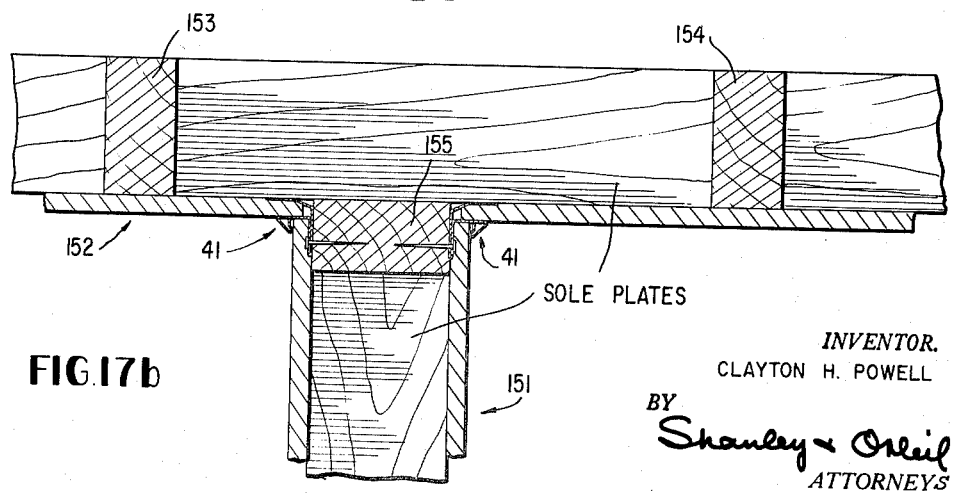

Sept. 21, 1965   C. H. POWELL   3,206,806
CORNER STRIP MEMBER FOR INTERCONNECTING PANELS
Filed Jan. 16, 1961   8 Sheets-Sheet 6
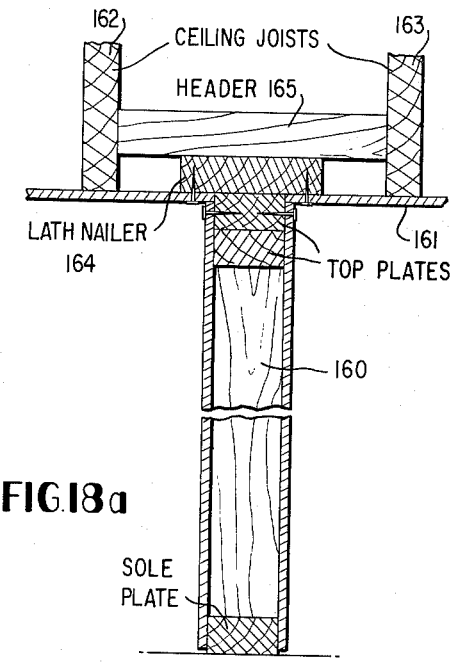
FIG.18a
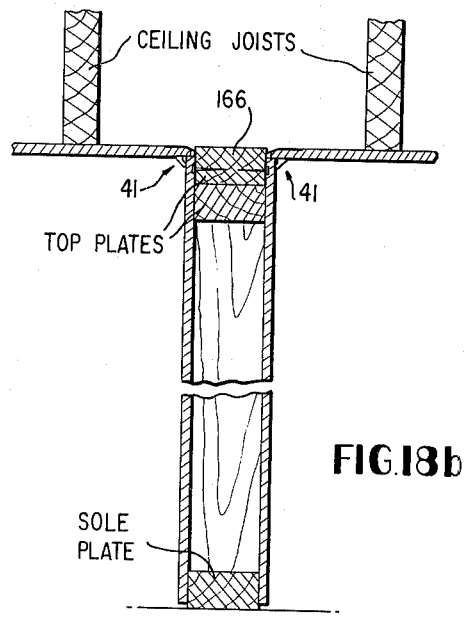
FIG.18b
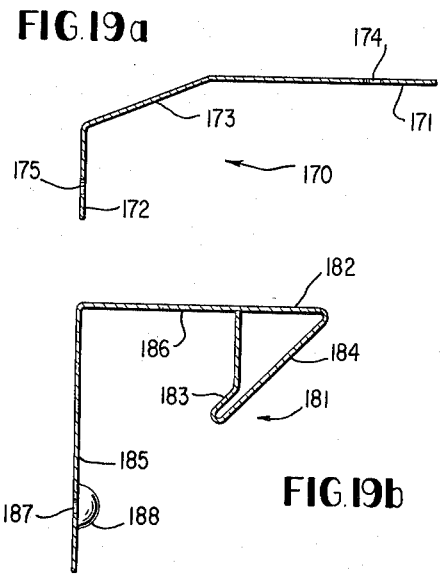
FIG.19a
FIG.19b
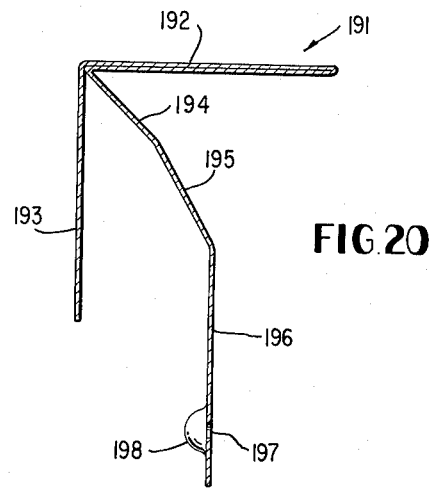
FIG.20
*INVENTOR.*
CLAYTON H. POWELL
BY
Shanley & O'Neil
*ATTORNEYS*

Sept. 21, 1965          C. H. POWELL          3,206,806
CORNER STRIP MEMBER FOR INTERCONNECTING PANELS
Filed Jan. 16, 1961          8 Sheets-Sheet 7
FIG. 21
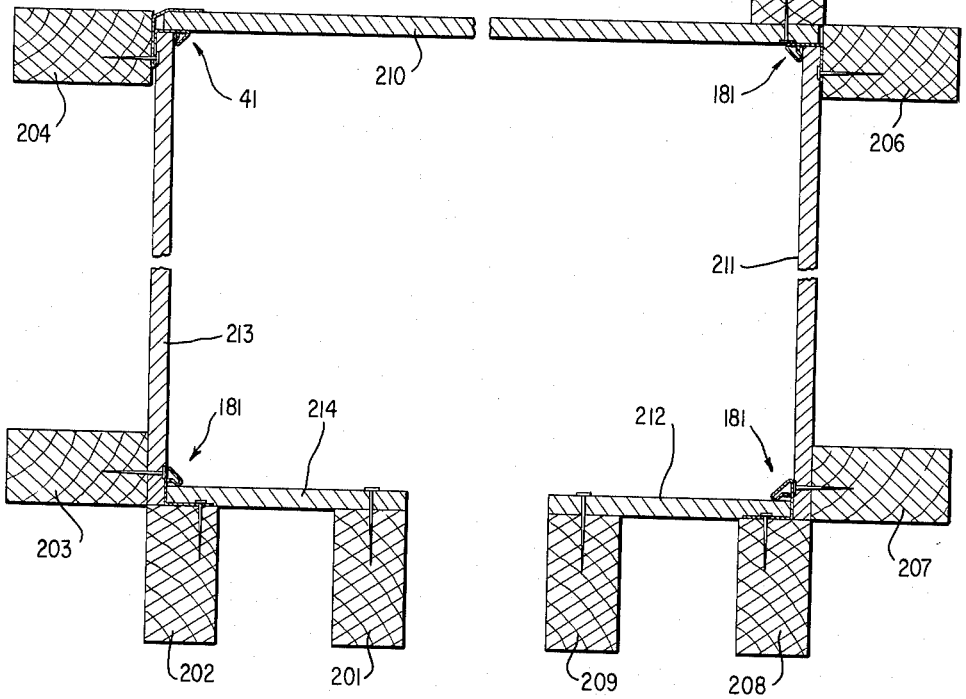
FIG. 23
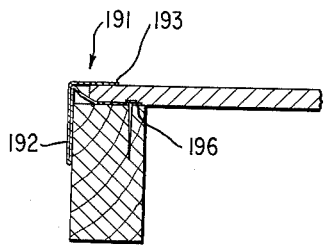
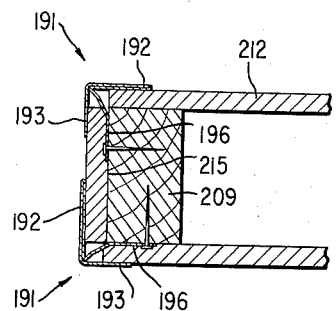
FIG. 22
INVENTOR.
CLAYTON H. POWELL
BY
Shanley & O'Neil
ATTORNEYS Sept. 21, 1965 C. H. POWELL 3,206,806
CORNER STRIP MEMBER FOR INTERCONNECTING PANELS
Filed Jan. 16, 1961 8 Sheets-Sheet 8
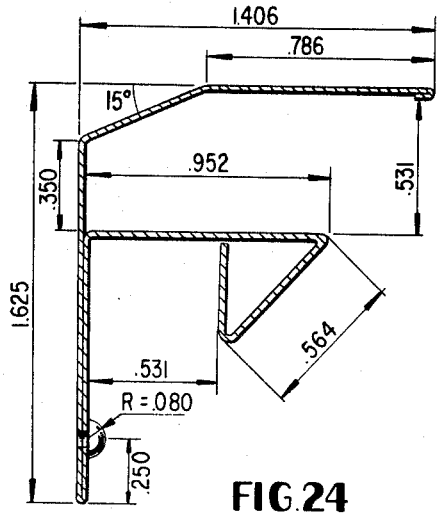
FIG. 24
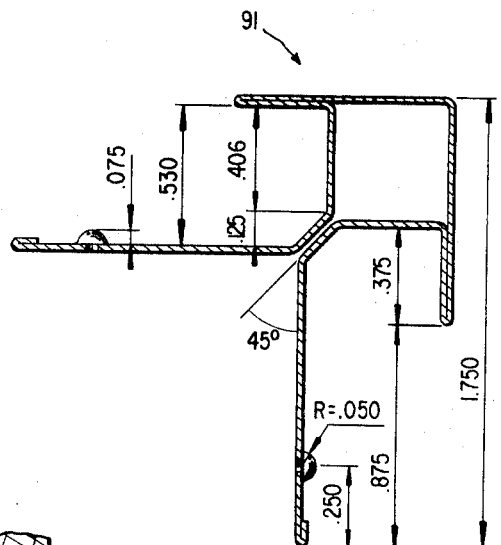
FIG. 25
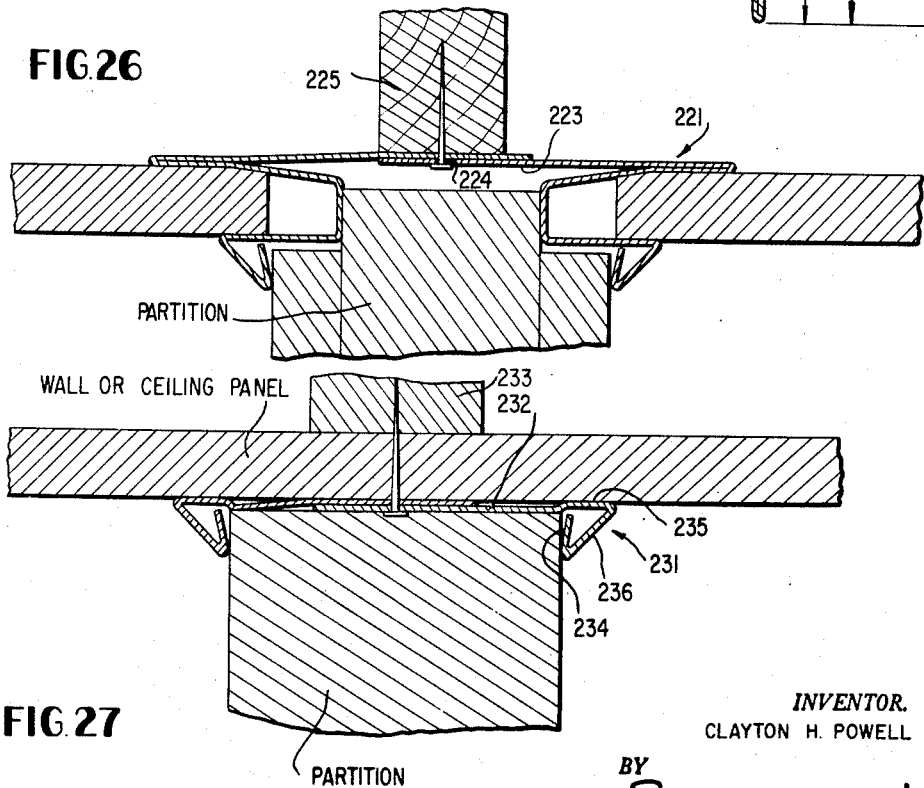
FIG. 26
FIG. 27
INVENTOR.
CLAYTON H. POWELL
BY
Shanley & O'Neil
ATTORNEYS United States Patent Office 3,206,806
Patented Sept. 21, 1965

3,206,806
CORNER STRIP MEMBER FOR
INTERCONNECTING PANELS
Clayton H. Powell, Suite 502, 1413 K St. NW.,
Washington, D.C.
Filed Jan. 16, 1961, Ser. No. 82,764
1 Claim. (Cl. 20—92)

The invention is concerned generally with wall and ceiling construction and, more particularly, with methods and apparatus for installing and finishing wall and ceiling coverings.

The installing and finishing of surface coverings, such as interior walls and ceilings in the building art, accounts for a major portion of the time and skilled labor required in finishing a construction. Their installation impedes practically all subsequent stages in construction, and when the installing or finishing method requires drying out time the delay is prolonged. In an effort to speed up the installation and finishing of surface coverings, "dry wall" construction has largely supplanted "wet wall" construction.

"Wet wall" construction involves the application of wet plaster compounds to grating or board nailed to the building framework. "Dry wall" construction involves the installation of dry sheets or panels, commonly referred to as wall board, which are applied to the building framework.

In conventional "dry wall" construction, wall board is secured to the framing near all the peripheral edges of the sheet and also at intermediate areas where supporting framework is available. After securing the wall board a time consuming *wet* operation remains, that is finishing the "dry wall" joints. In applying gypsum board, finishing is commonly a wet operation.

Finishing is especially tedious and requires special skills at all angled intersections of surface coverings. These intersections, corner and ceiling lines, are filled with a wet joint compound called joint cement, and a special porous tape is embedded in the corner. After the joint cement has dried thoroughly, usually a period of overnight or 24 hours, depending upon atmospheric conditions, the corner is "spread out".

In spreading out a corner, heavy coatings of joint cement are applied in an effort to give the appearance of smooth wall and ceiling surfaces meeting at a straight intersection. The difficulty here is that the surface covering follows the construction framework and true horizontal and vertical lines at angled intersections are not frequently available in a building framework. It is up to the craftsman in this art to create the impression of straight corners by applying heavy or thin coatings of the joint cement to remove the wavy appearance of the covering as it follows the framing. In actuality, the craftsman must "make" the corner with the wet joint cement employing the same skills required in "wet wall" construction. While the corner is being made, the edges of the heavy coatings are feathered in order to give the appearance of smooth walls and ceilings.

In these operations the joint cement may have a thickness of from ⅛ to ½ inch in some places, depending on framing conditions. This thick coating of joint cement requires from one to three days to dry dependent upon atmospheric conditions. Second, third, and sometimes fourth applications of joint cement are made. Between each application, the prior application must be thoroughly dried; these applications are sanded and the edges feathered to create the impression of smooth walls and ceilings. These operations may require from five to seven days, including drying time, for an average three bedroom house under ideal atmospheric conditions. In damp weather, the period is prolonged further and heat is often required. In general, these wet operations cannot be conducted during freezing weather without heat.

One of the objectives of the invention is to eliminate finishing operations from "dry wall" construction. Specifically to eliminate the most difficult and time consuming part of conventional "dry wall" construction, that is at wall and/or ceiling intersections, and thereby effect significant savings in time, skilled labor, and materials.

Conventional "dry wall" construction has other drawbacks separable from the large amount of materials and time involved. As previously mentioned, the plumb of the corner lines and the level of ceiling lines are dependent on the construction framework including the plane of the floor. This makes installation difficult. After installation, the corner lines remain dependent on the construction framework. As the construction framework is subject to movement, from swelling and contraction due to atmospheric conditions, uneven settling, or aging of the framing, wavy surface and intersection lines appear. These detract in general from the quality of the entire installation and finishing operation.

Another objective of the invention is to provide methods and apparatus, for simplifying installation of walls and ceilings, which furnish and maintain clean lines and perfect corners automatically.

The invention provides methods and apparatus for installing walls and ceilings in a single operation while eliminating the conventional additional steps and materials ordinarily required to give the appearance of smooth wall and ceiling surfaces and intersections.

The exact nature and other advantages of the invention will be more apparent from the detailed description to follow, during which reference will be had to the accompanying drawings, wherein.

Figure 3:
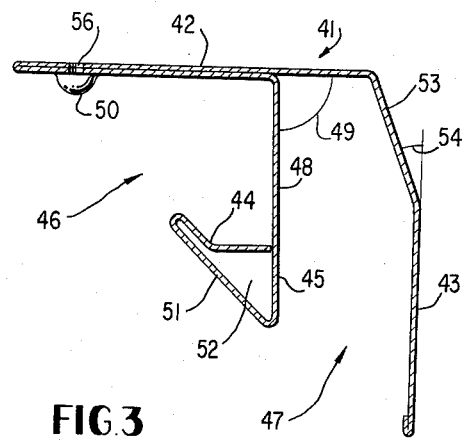
FIG. 3 is a sectional view of apparatus embodying the invention.
Figure 10:
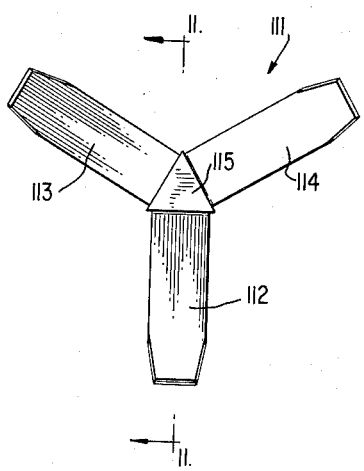
Figure 11:
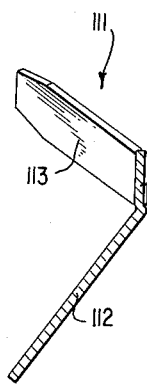
Figure 12:
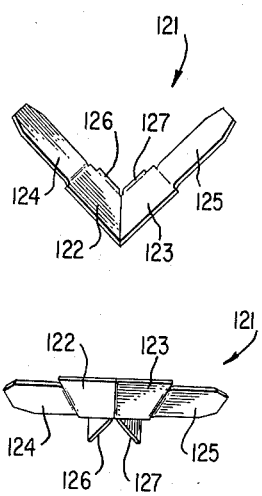
Figure 13:
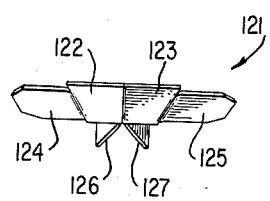
Figure 14:
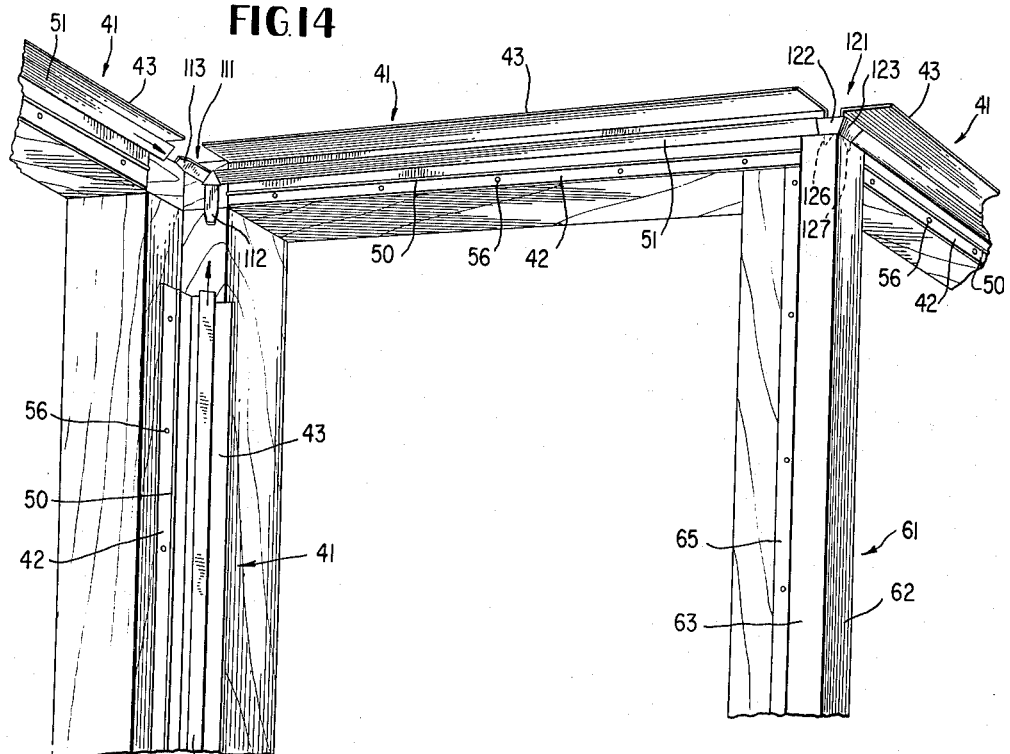
Figure 15:
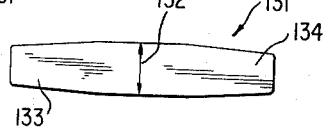

FIGS. 5(a) and (b) are sectional views illustrating use of the apparatus of FIG. 3;

FIGS. 5(c) and (d) are sectional views of apparatus embodying the invention;

FIG. 6 is a sectional view of apparatus embodying the invention;

FIG. 7 is a perspective view of apparatus embodying the invention;

FIG. 8 is a sectional view of apparatus embodying the invention;

FIG. 9 is a frontal view of a structural element comprising a portion of the invention;

FIG. 10 is a plan view of a dowel element used with the invention;

FIG. 11 is a side view, partially in section, of the dowel element of FIG. 10;

FIG. 12 is a plan view of another dowel element used with the invention;

FIG. 13 is a front view of the element of FIG. 12;

FIG. 14 is a perspective view illustrating use of the apparatus of FIGS. 3, 6, 10 and 12;

FIG. 15 is a frontal view of a structural element comprising a portion of the invention;

FIGS. 16(a) and (b) are sectional views illustrating construction methods according to the prior art and the invention, respectively;

FIGS. 17(a) and (b) are sectional views illustrating construction methods according to the prior art and the invention, respectively;

FIGS. 18(a) and (b) are sectional views illustrating construction methods according to the prior art and the invention, respectively;

FIGS. 19(a) and (b) are sectional views of apparatus embodying the invention;

FIG. 20 is a sectional view of apparatus embodying the invention;

FIG. 21 is a sectional view illustrating use of the apparatus of FIGS. 3 and 19(b);

FIGS. 22 and 23 are sectional views illustrating use of the apparatus of FIG. 20;

FIG. 24 is a sectional view of a specific embodiment of the invention with dimensions;

FIG. 25 is a sectional view of a specific embodiment of the invention with dimensions;

FIG. 26 is a sectional view illustrating use of apparatus comprising a portion of the invention; and FIG. 27 is a sectional view illustrating use of the apparatus comprising a portion of the invention.

Figure 1:
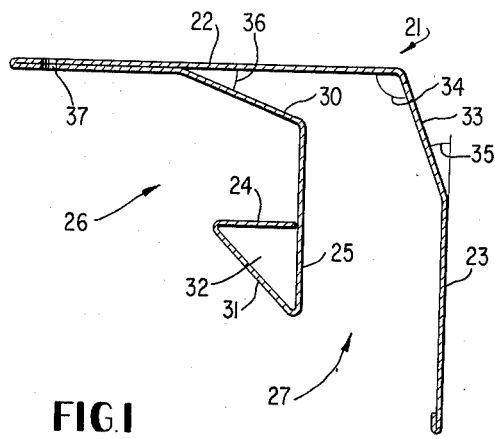
FIG. 1 is a sectional view of apparatus embodying the invention.

FIGS. 1–4 illustrate structure which may be used at all inside wall and ceiling corners. Referring in particular to FIG. 1, structure 21 includes subsurface or base flanges 22 and 23 which lie in planes intersecting at an angle of 90°. Positioned within the interior angle between the planes of subsurface flanges 22 and 23 are surface corner flanges 24 and 25 which are substantially parallel to the subsurface flanges 22 and 23 and in combination therewith define panel receiving means 26 and 27. The surface flanges 24 and 25 are joined to one of the subsurface flanges 22 by a corner web 30 which projects from the flange 22. The interior angle between the surface flange means 24 and 25 is closed by a molding web 31 to form a socket 32.

Although subsurface flanges 22 and 23 lie in planes which, if extended, meet at a right angle, the flanges themselves do not meet at this angle as flange 23 deviates from its plane to form an angled web 33 which meets the remaining flange 22 at an obtuse angle 34. Web 33 deviates from the flange 23 by an acute angle 35. The corner web 30 which connects the surface flange 25 to the subsurface flange 22 deviates from the plane of flange 22 at an angle 36 of approximately the same magnitude as angle 35.

Figure 2:
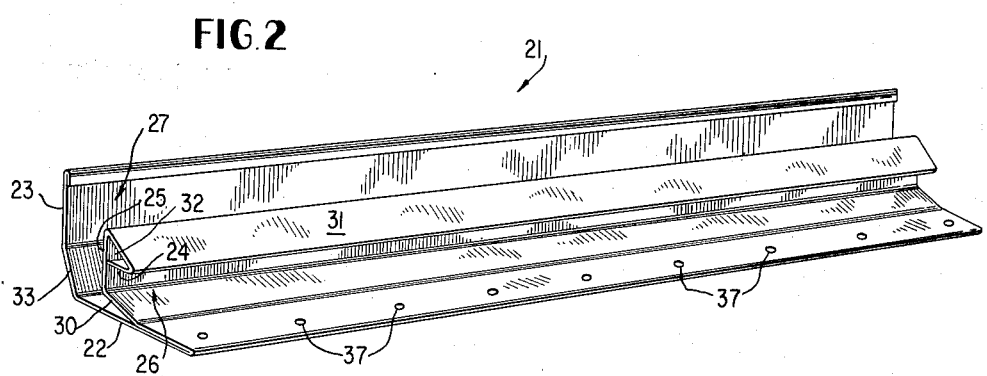
FIG. 2 is a perspective view of apparatus embodying the invention.

Referring to FIG. 2, the structure 21 is shown as an elongated strip member, continuous along its longitudinal dimension, forming continuous elongated receiving channels 26 and 27. At least one of the subsurface flanges includes indention means for securing the strip member to construction framing, such as apertures 37, periodically positioned along flange 22 exterior to a perpendicular projection of the surface flange 24 onto the flange 22.

Referring in particular to FIG. 3, structure 41 is similar to that of FIG. 1 in that subsurface flanges 42 and 43 lie in planes which intersect at a right angle. Surface flanges 44 and 45 lie within the interior angle between the planes of flanges 42 and 43 and define in combination with these flanges panel receiving means 46 and 47. The surface flanges 44 and 45 are joined to the subsurface flange 42 by a corner web 48. Preferably, angle 49, between web 48 and flange 42 is slightly less than 90°, for example 88°. Subsurface flange 42 includes a protrusion 50 which extends from the plane of flange 42 toward the surface flange 44 and is located contiguous the entry portion of channel 46. The interior angle between the surface flanges is closed by a molding web 51 to form socket 52.

The subsurface flanges 42 and 43 lie in planes which, if extended, intersect at an angle of 90°, however flange 43 deviates, from its plane to form an angled subsurface web 53, by an acute angle 54.

Figure 4:
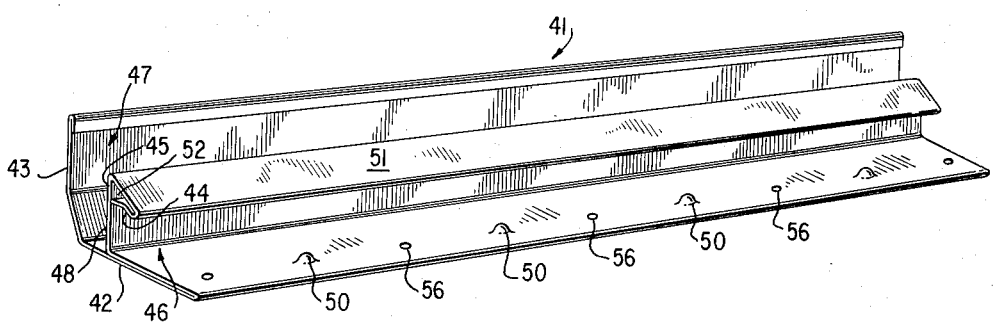
FIG. 4 is a perspective view of apparatus embodying the invention.

Referring to FIG. 4 the structure 41 is shown as an elongated strip member, continuous along its longitudinal dimension, forming the elongated continuous receiving channels 46 and 47. The subsurface flange 42 includes apertures 56 periodically positioned along its longitudinal dimension exterior to a perpendicular projection of the adjacent spaced surface flange 44 onto subsurface flange 42; protrusions 50 are similarly positioned on the subsurface flange 42.

While the embodiments of FIGS. 1 to 4 have been shown with the surface and subsurface flange means in angled relationship to form a 90° juncture it is understood that the principles of the invention may be applied to forming junctures of other angular magnitudes. Also the sockets 32 and 52 need not be generally triangular in configuration and the molding webs 31 and 51 can be curvilinear rather than rectilinear, so that the sockets 32 and 52 can be changed in cross sectional configuration without disturbing their function which will be considered in later paragraphs.

While protrusion means 50 of FIGS. 3 and 4 is shown on subsurface flange 42, it is to be understood that the invention is not to be limited by such disclosure. Such protrusion means may be used on either flange, may be continuous, or may be interrupted with indentions, such as apertures 56, located at such interruptions. It is also to be understood that protrusion means 50 is not limited to being a projection of the material comprising flange 42 but may also be an addition to such material or an addition to the head portion of nails or similar securing means used with the structure. The configuration of any protrusion means should be such that piercing of a panel surface is avoided.

To describe the operation of establishing a juncture for the angled intersection of surface covering panels at an inside corner reference will be had to FIGS. 5(a) and (b) wherein elongated strip member 41 is used to form the intersection of a wall and a ceiling panel. The elongated strip member 41 is horizontally disposed and nailed or otherwise secured to the vertical framing. Referring in particular to FIG. 5(a), a ceiling panel is inserted into the channel 47 to contact angled web 53 with some force. The subsurface angled web 53 is placed under stress urging the ceiling panel 59 into contact with the surface flange 45 which may be forced slightly downward from its original position as shown in dotted lines. A wall panel 60 is brought into contact with the strip member 41 at an angled relationship to the channel 46 as shown. The distance between protrusion 50 and the closest part of surface flange 44 should be at least equal to the thickness of the panel. Referring now to FIG. 5(b), the panel is inserted into the channel 46 and brought into the intended plane of the wall. The protrusion 50 acts as a fulcrum and the panel acts as a lever; the panel is urged into tight contact with the surface flange 44. A force is exerted on surface flange 44 which is transmitted through web 51 and moves surface flange 45 slightly upward and tightens the contact of the panel at both surface flanges. The structure will support and retain panels and present a true corner and tight lines; no finishing operations are required.

In the embodiment shown in FIG. 5(a), the surface flange 45 is angled slightly toward the subsurface flange before the panel is inserted to insure a tight line between the strip member and the ceiling panel where bad ceiling framing prevails. It is also possible to secure the same effect by angling surface flange 45 toward the subsurface flange 43 at some point intermediate its ends as shown in FIG. 5(c) or by including a ridge along its edge as shown in FIG. 5(d). As in the embodiment of structure 41 previously described the subsurface flange 44 is extended to be in contact or near contact with subsurface flange 45 for the purpose of providing good support for molding web 51 and preventing distortion thereof should panels be brought to rest improperly on such web.

FIGS. 6 through 8 illustrate structure which can be used to provide an impact-protected juncture at all outside corners. Referring in particular to FIG. 6, structure 61 includes surface or corner flanges 62 and 63 which intersect at an angle of 90°. Within the interior angle formed thereby, subsurface or base legs 64 and 65 lie in spaced planes having an angular relationship substantially coincident with such interior angle. The subsurface flanges 64 and 65 do not intersect but deviate by acute angles 66 and 67, respectively, to form subsurface angled webs 68 and 69. Corner web 70 connects angled web 68 to adjacent surface flange 62, and similarly, corner web 71 connects angled web 69 to adjacent surface flange 63. The web means interconnect the surface and subsurface flange means to define receiving means 72 and 73.

Referring in particular to FIG. 7, structure 61 is shown as an elongated strip member 61, continuous along its longitudinal dimension, as are the surface flanges 62, 63, the subsurface flanges, 64, 65, and the receiving channels 72, 73. The subsurface flanges 64 and 65 include indentions such as apertures 74 and 75, positioned periodically along the length of the strip member exterior to the panel receiving channels.

In FIG. 8, structure 91 includes corner legs 92 and 93 which intersect at right angles. Within the interior angle formed thereby subsurface flanges 94 and 95 lie in planes substantially parallel to the surface flanges 92 and 93. The subsurface flange 94 deviates toward the adjacent surface flange 92 at an angle of approximately 45° forming angled web 96. Similarly, flange 95 deviates toward the adjacent surface flange 94 at an angle of approximately 45° forming an angled web 97. Corner web 100 connects angled web 96 to adjacent flange 92, and corner web 101 connects angled web 97 to adjacent flange 93. The web means interconnect the surface and subsurface flange means to define panel receiving means 102 and 103. Protrusions 104 and 105 are positioned on the subsurface flanges extending toward adjacent surface flanges contiguous with the entry portions of the panel receiving channels.

Referring to FIG. 9, strip member 61 is secured to a stud 76 by nails or other fastening means 77 and 78 passing through apertures 74 and 75 respectively. A surface covering member 80 is inserted into the channel 72 and brought into contact with web 68 with some force. When inserted in this manner, the angled web 68 exerts a spring tension effect forcing the portion of panel 80 within the channel 72 against the surface flange 62. Similarly, a surface covering member 81 is inserted into the receiving channel 73 contacting web 69 with some force. When inserted in this manner, the portion of panel 81 within the channel 73 is forced into contact with surface flange 63. There is a coaction when both panels are inserted in this manner and brought into the intended planes of the walls which puts the web means and surface flange means under stress and causes a tight line contact on the surface of both panels which does not require any finishing operations.

When using the embodiment shown in FIG. 8 the angled approach to the receiving channels is used with both panels and the fulcrum-lever action previously described in relation to the strip member 41 puts the web means and surface flange means under stress forcing the panels into tight contact with the surface flanges.

The invention also includes special dowel means for automatically aligning and joining elongated strip members where they meet at all three-dimensional inside and outside corners. Referring to FIGS. 10 and 11, inside corner dowel 111 includes three prongs 112, 113, and 114 extending outwardly from a main body 115. Dowel 111 is three-dimensional; if prong 112 is held vertically prongs 113 and 114 extend at right angles to each other in a horizontal plane. The prong 112 is disposed across an interior angle defined by the intersection of two walls, the prongs 113 and 114 are disposed across the interior angle defined by the intersection of each wall and the ceiling. The main body 115 closes the interior three-dimensional angle at the apex of the three-dimensional corner formed by the three prongs 112, 113, and 114.

In operation, the dowel 111 is used at three-dimensional inside corners by inserting a prong in a socket of an inside corner strip member, such as socket 32 of strip member 21. The remaining prongs are then properly oriented for the alignment and joining of other inside corner strip members to form a three-dimensional corner. The main body 115 closes the corner between the molding web means of the strip members and a continuous surface structure results. In addition to the correct alignment and joining functions performed by the dowel, the need for mitering of strip members at a corner is eliminated since straight edge strips can be joined at a corner because of the orientation of the main body 115.

Referring to FIGS. 12 and 13 dowel 121, used for three-dimensional outside corners, includes main body members 122 and 123 with prongs 124 and 125 extending therefrom substantially coplanar with the inner surface of main body members 122 and 123 respectively. Tabs 126 and 127 depend downwardly from members 122 and 123 respectively. When tabs 126 and 127 are held vertically the main body members 122 and 123 extend horizontally at right angles to each other with their planar portions angled to the vertical. The main body members 122 and 123 and the prongs 124 and 125 are disposed to close the interior angle at the intersection of wall and ceiling surfaces meeting at an outside corner.

In operation, dowel 121 is used at three-dimensional outside corners to align and join two inside corner strip members, such as strip members 41, and an outside corner strip member such as 61. Prongs 124 and 125 fit into sockets 52 of strip members 41 and tabs 126 and 127 into strip member 61 paralleling legs 62 and 63. The main body members 122 and 123 complete the molding webs 51 of strip members 41 so that no mitering of the strip members is necessary and the appearance of a continuous molding is presented.

The interconnection of the dowel means and strip members can be seen in FIG. 14 where an inside corner and outside corner are formed in alternate relationship such as occurs when a closet protrudes into a room. Dowel 111 is used to align and join the inside corner strip members 41 along the ceiling lines at the inside corner, the depending prong 112 is used to align and join the strip member 41 at inside corner intersection of the wall surfaces. The dowel 121 is used to align the ceiling line strip member 41 at the outside corner and the tabs fit into the outside corner strip member 61 to align and join this strip member to the strip members along the ceiling lines.

Where elongated strip members are to be joined along a straight line a special dowel means is provided for alignment of the strip members. Referring to FIG. 15, substantially planar spline 131 has a mid-sectional width 132 which is at least equal to the inside dimension across the molding webs of the elongated strip members described so that a tight fit and good alignment can be achieved. The spline 131 has tapered portions 133 and 134 along its longitudinal dimension for easy entry of the spline into the sockets.

Considering objectives of the invention mentioned earlier, and in particular the savings in building material, it is obvious that a savings in joint cement, tape, etc. results from eliminating the necessity of "making corners." However there is an additional savings resulting from the novel method of installing surface covering panel provided by the invention. This savings is in framing material. Consider the average dwelling house framing construction; detailed discussions of prior art methods are found in "Dwelling House Construction" by Albert G. H. Dietz, 2nd edition, copyright 1954, D. Van Nostrand Co., Inc., Chapter 5, or "Wood-Frame House Construction," U.S. Dept. of Agriculture, Forest Service Agriculture Handbook No. 73, February 1955, pages 38 and 39. Such conventional methods and the improved method of the invention, which results in considerable savings in framing material, will be compared in the discussion of FIGS. 16(a) and (b), 17(a) and (b), and 18(a) and (b).

Referring to FIG. 16(a), a conventional framing arrangement for both an outside and inside corner at the same location is shown in a plan view from the ceiling toward the floor. Stud 139 and lath nailers 140 and 141 are toe-nailed into the sole plates at the floor and into the top plates at the ceiling. For the outside corner, the lath can be nailed to the stud 139 though, usually, additional supports (not shown) are provided. The inside corner requires two separate and distinct lath nailers as shown. Referring to FIG. 16(b) the system of the invention eliminates a lath nailer at all interior framing corners. Since the outside corner strip member 91 can be nailed to the corner stud 142 and the inside corner strip member 41 can be nailed to the strip nailer 143 and these members provide all the necessary backing, no additional framing members are required.

At a T intersection of interior framing walls the structure formerly required is shown in 17(a). Studs 144 and 145 are usually spaced at approximately 16-inch intervals. In the plan view shown, the wall 146 is intersecting wall 147 between the stud members 144, 145. Under these conditions, lath nailers 148, 149 and 150 are necessary for attaching the lath at the inside ecorners. A lath header or spacer 151 is also conventionally included. Referring to FIG. 17(b) the wall 151 intersects the wall 152, as above, intermediate studs 153 and 154. However, in this arrangement a single strip nailer 155 is required so that a saving of two lath nailers and a lath spacer results.

Referring to FIG. 18, views a and b are side views concerned with showing the savings in framing when installing a ceiling using the teachings of the invention. FIG. 18(a) shows a conventional system when an interior wall 160 intersects the ceiling 161 between the joists 162 and 163. In such case a two-inch by eight-inch lath nailer 164 is necessary over the wall 160 and the lath nailer 164 is conventionally backed up by a header 165. The ceiling panels are then nailed to the lath nailer 164 and the wall panels are nailed to the top plate 166. In accordance with the invention where a wall intersects the ceiling intermediate joists FIG. 18(b) no lath nailer or header is required since the inside corner members 41 can be attached to top plate 166.

After installing the framing as described immediately above, a first ceiling line for an enclosure is determined by securing a cornering structure along a strip nailer (top plate) at the intended intersection of the ceiling surface and a first wall surface. Preferably this ceiling line is established by leveling the first cornering member in a true horizontal plane before securing to the framing. Three-dimensional dowels at the end of the first ceiling line are used for aligning and joining subsequent cornering members, with the alignment and joining with dowels being repeated at each three-dimensional corner until the ceiling line is completed for the enclosure. The ceiling is covered by first inserting panels in the cornering structure around the periphery of the enclosure and then adding additional panels to complete the ceiling by working from the peripheral panels toward an intermediate area of the ceiling.

The dowels supported along the ceiling line at three-dimensional corners have prongs extending downwardly for the alignment of cornering structure at the intersection of the wall surfaces. Cornering structure for these intersections is aligned and joined to the dowels and secured in the corners to the strip nailers. Then each wall surface is completed by first inserting panels in the cornering structure and working from those panels toward an intermediate area of the wall surface until the entire wall is covered. Abutting edges of surface covering panels in the ceiling and walls can be covered with tape and joint compound, or otherwise, but no such finishing operations are required at any of the angled intersections of the surface covering panels.

While various cornering structures have been disclosed as continuous unitary strip members, some advantages of the invention could be obtained with other than a unitary structure, for example some backing portions could be separately secured to construction framing and could be made other than continuous. Such cornering structures would be especially suitable for tight enclosures such as closets or narrow halls etc. where inserting two or more peripheral edge portions of a surface covering panel simultaneously into panel receiving means is not convenient. Examples of typical configurations and applications will be considered in relation to FIGURES 19 through 23.

Referring to FIG. 19(a), subsurface angle 170 includes subsurface flanges 171 and 172 interconnected by web 173. Either flange may include indentions, such as 174 and 175, for securing the angle structure to construction framing.

In FIG. 19(b) the structure 181 includes surface flanges 182 and 183 connected by molding web 184 and subsurface flange 185 connected to surface flange 182 by corner web 186. Subsurface flange 185 includes indention 187 and protrusion 188.

The cornering structure 191 of FIG. 20 includes corner flanges 192 and 193 joined by webs 194 and 195 to subsurface flange 196. The subsurface flange includes indention 197 and protrusion 198.

FIG. 21 shows a closet in plan view outlined by studs 201 through 209. These studs are toe-nailed to sole plates and top plates (not shown). Backing for a ceiling panel is established by nailing the angle structure 170 to the top plates. A ceiling panel is cut to the size of the closet and held against the angle structures or may be secured to top framing at an intermediate area of the ceiling panel. The cornering structures 181 are then secured to the top plate with the surface flanges 182 in tight contact with the ceiling panel and the subsurface flanges 185 extending downwardly to provide a wall panel receiving channels between surface flanges 133 and subsurface flanges 185. During installation the ceiling line corner structures 181 are aligned and joined together at all angular intersections of the ceiling lines by dowels 111.

Wall surface installation can be started by securing an inside corner structure 41 to stud 204. Wall panel 210 is cut to size so as to extend between studs 204 and 205. One vertical end of panel 210 is then inserted into the panel receiving channel in structure 41 which opens in the direction of the stud 205. The remaining vertical end of panel 210 is nailed to stud 205.

A corner structure 181 is placed in tight contact with panel 210, as shown, and is nailed to stud 206. Wall panel 211 is cut to size so as to extend between studs 206 and 207. One vertical end of panel 211 is inserted into the panel receiving channel of structure 181 which opens in the direction of stud 207. The opposite vertical end is nailed to the stud 207.

A corner structure 181 is placed in tight contact with panel 211 and nailed to stud 208. Wall panel 212 is then cut to size so as to extend between studs 208 and 209. One vertical end of panel 212 is inserted into the panel receiving channel of structure 181 which extends toward stud 209. The remaining vertical end of panel 212 is then nailed to stud 209.

Returning to the strip member 41, wall panel 213 is cut to size so as to extend between stud 203 and 204 and is inserted into the panel receiving channel of structure 41 which opens in the direction of stud 203. The remaining vertical end of wall panel 213 is nailed to stud 203.

Wall panel 214 is cut to size so as to extend between stud 201 and 202. A cornering structure 181 is placed in tight contact with wall panel 213 and nailed to stud 202. One vertical end of the wall panel 214 is inserted into the panel receiving channel of cornering structure 181 and the remaining vertical end is nailed to stud 201.

An alternate method of installing panels at the entranceway of a closet is shown in FIG. 23. In place of nailing wall panel 212 it is held securely against stud 209 by corner structure 191. Subsurface flange 196 of corner structure 191 is nailed to face 215 of stud 209. The surface covering can be continued around the entranceway and exterior of the closet as shown. Where surface covering is to terminate at an outside corner structure 191 can be employed as shown in FIG. 23.

While the structures just described are especially suitable for small enclosures such as closets, hallways, etc. it is understood that they are not limited to such application.

A specific example of dimensions for strip members 41 and 91 when employed for installing half-inch gypsum board is shown in FIGS. 24 and 25. In the embodiments of FIGS. 24 and 25 the strip members 41 and 91 are formed from 26 gage cold rolled steel strip. The invention is not limited to a rolled or a steel product, but may be rolled or extruded from other materials which possess the necessary strength elasticity, and durability.

The teachings of the invention cover installing and finishing operations with partitions. Referring to FIG. 26, the structure 221 has a subsurface flange 223 which includes indention 224 for securing structure 221 to construction framing member 225. Web means interconnect surface flanges and subsurface flanges so that surface covering panels are supported by structure 221 as shown in partitioning an enclosure.

In FIG. 27, a molding structure is shown which may be used at the angled intersection of a partition and a wall or ceiling panel; the structure is especially adapted for use where there are continuous ceilings or walls for the installation of on-site constructed or prefabricated partitions. Molding structure 231 includes subsurface flange 232 which is nailed or otherwise secured to the framing member 233. Surface flanges 234 and 235 contact the partition and wall or ceiling panel respectively as shown and molding web 236 closes the interior angle of intersection of the panel and partition. It should be noted that leg 232 is not coplanar with flange 235 but is slightly removed in the direction of the partition; such configuration contributes to the tightness of the line at both the panel and the partition by causing a force to be exerted through the molding web 236.

Surface coverings have various compositions and designations in the building art. In composition they can vary from vegetable fiber to metal. In designation, such terms as sheets, panels, and partition are used with hardboard, gypsum board, plasterboard, wall board, etc. It is understood that the invention extends to the installation and finishing of any surface covering or partition in the building art and is not to be limited by such terms as wall board which is commonly used for both walls and ceilings.

In environments where air movement could cause streaking of wall or ceiling panels by passing through the cornering structure, insulation, in the form of felt or sponge rubber, may be provided in the panel receiving portions of the cornering members.

In disclosing the invention, various methods and structures have been described. Modifications of these methods and structures are contemplated, including rearrangements of steps in the methods and combinations of portions of the structures set forth. Many of these modifications are made possible in the light of the teachings of the invention included herein. It is therefore to be understood that, within the scope of the appended claim, the invention may be practiced otherwise than as specifically described.

I claim:

An elongated unitary strip member for interconnecting dry wall panels at corner intersections by receiving, supporting, and retaining a pair of dry wall panels in channels disposed at an angle substantially 90° and fixing the position of the dry wall panels with relation to construction framing to form an inside corner structure comprising subsurface flange means for providing subsurface support to dry wall panels including first and second spaced subsurface flanges lying in planes which intersect at substantially 90°, the first subsurface flange including means for securing the elongated strip member in fixed positional relationship to construction framing, the securing means comprising a plurality of apertures longitudinally spaced along the first subsurface flange, surface flange means for providing surface support for dry wall panels, the surface flange means being disposed substantially parallel with the subsurface flanges within the interior angle defined by the planes of the subsurface flange means so as to define a pair of panel receiving channels lying in planes which intersect at an angle of substantially 90°, the surface flange means including a first surface flange extending at an angle of substantially 90° from the first subsurface flange means in substantially parallel relationship to the second subsurface flange means, a surface corner web extending from the outer terminal of the first surface flange away from the second subsurface flange and in a direction toward the first subsurface flange at an angle of substantially 45° with the first surface flange and terminating in an edge spaced from the first subsurface flange, and a second surface flange extending from the spaced edge of the surface corner web toward the first surface flange, subsurface web means interconnecting the first and second subsurface flanges, the subsurface web means extending at an angle between the subsurface flanges diminishing the cross-sectional area of the panel receiving channel defined by the second subsurface flange and first surface flange, the first surface flange extending toward and connected to the first subsurface flange defining with thesecond subsurface flange one of the panel receiving channels, and panel gripping means extending from the first subsurface flange toward the surface flange means, the panel gripping means including rounded protrusions longitudinallly spaced along the subsurface flange exterior to a perpendicular projection of the spaced edge of the surface corner web onto the first subsurface flange, the subsurface flange means, surface flange means, inside corner web means, subsurface web means, and panel gripping means, being made of resilient material to retain dry wall panels inserted into the receiving panels with the resilient material being placed under strain by a coaction between the surface flange means, subsurface flange means, surface corner web means, subsurface web means, and panel gripping means forcing tight contact between each panel and its adjacent surface flange.

(References on following page)

References Cited by the Examiner

UNITED STATES PATENTS

| | | | |
|---|---|---|---|
| 1,161,764 | 11/15 | Doner | 50—164 X |
| 1,634,862 | 7/27 | Yoder | 50—165 |
| 1,717,740 | 6/29 | Simon. | |
| 1,798,839 | 3/31 | Gross | 50—171 |
| 1,885,330 | 11/32 | Cherdron | 50—55 X |
| 2,121,213 | 6/38 | Small. | |
| 2,138,470 | 11/38 | Bischof. | |
| 2,274,317 | 2/42 | Bonnell | 20—74 |
| 2,371,493 | 3/45 | Aschinger. | |
| 2,379,179 | 6/45 | Petersen. | |
| 2,489,670 | 11/49 | Powell. | |
| 2,663,390 | 12/53 | Dordel. | |
| 2,765,886 | 10/56 | Tedaldi. | |
| 2,904,992 | 9/59 | Cruser | 50—138 X |
| 3,038,276 | 6/62 | Butler. | |

FOREIGN PATENTS

| | | |
|---|---|---|
| 925,679 | 3/47 | France. |
| 597,105 | 1/48 | Great Britain. |
| 1,097,059 | 2/55 | France. |

References Cited by the Applicant

UNITED STATES PATENTS

| | | |
|---|---|---|
| 3,020,602 | 2/62 | Siering. |
| 3,027,605 | 4/62 | Nelsson. |

OTHER REFERENCES

Practical Builder Magazine, November 1960, p. 71.

EARL J. WITMER, *Primary Examiner*.

JACOB L. NACKENOFF, *Examiner*.